United States Patent
Chang et al.

Patent Number: 5,835,779
Date of Patent: *Nov. 10, 1998

[54] MESSAGE TRANSMISSION AMONG PROCESSING UNITS USING INTERRUPT CONTROL TECHNIQUE

[75] Inventors: Leon F. Chang, Gahanna; Alan Perry Wilson Hewett, Pataskala; David Michael Rouse, Granville, all of Ohio

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 617,947

[22] Filed: Mar. 15, 1996

[51] Int. Cl.⁶ ........................................................ G06F 9/16
[52] U.S. Cl. ................ 395/741; 395/200.47; 395/200.57
[58] Field of Search ..................................... 395/736, 740, 395/741, 282, 283, 281, 309, 310, 859, 872, 876, 500, 527, 200.53, 200.54, 200.55, 200.57, 200.6, 200.61, 200.67, 200.79, 200.8, 200.33

[56] References Cited

U.S. PATENT DOCUMENTS

| | | | |
|---|---|---|---|
| 5,123,094 | 6/1992 | MacDougall | 395/375 |
| 5,253,342 | 10/1993 | Blount et al. | 395/200.03 |
| 5,282,272 | 1/1994 | Guy et al. | 395/868 |
| 5,481,724 | 1/1996 | Heimsoth et al. | 395/200.01 |
| 5,553,293 | 9/1996 | Andrews et al. | 395/734 |
| 5,564,060 | 10/1996 | Mahalingaiah et al. | 395/871 |
| 5,574,862 | 11/1996 | Marianette et al. | 395/200.08 |
| 5,588,122 | 12/1996 | Garcia | 395/250 |
| 5,606,705 | 2/1997 | Randall et al. | 395/800.01 |
| 5,617,537 | 4/1997 | Yamada et al. | 395/200.01 |
| 5,619,697 | 4/1997 | Nishida | 395/680 |
| 5,706,516 | 1/1998 | Chang et al. | 395/680 |
| 5,742,843 | 4/1998 | Koyanagi et al. | 395/800.14 |

*Primary Examiner*—Meng-Ai T. An
*Assistant Examiner*—Raymond N. Phan
*Attorney, Agent, or Firm*—Charles L. Warren

[57] ABSTRACT

The transmission of messages among multiple processors is controlled by the use of token and message interrupts. A token interrupt must be received from the processor sought to perform message processing. Failure to receive such a token interrupt prohibits requesting processors from making processing demands, i.e. sending a message interrupt, to the processor. Message interrupts, which may only be transmitted following receipt of a token interrupt, identify commands and user messages to be processed by a receiving processor. This permits instructions and multiple messages to be handled by a processor based on receipt of a single message interrupt. This technique also allows a processor under a temporary heavy load to defer the handling of other processing requests by delaying the transmission of a token interrupt.

10 Claims, 3 Drawing Sheets

MESSAGE TRANSMISSION AMONG PROCESSING UNITS USING INTERRUPT CONTROL TECHNIQUE

BACKGROUND OF THE INVENTION

This invention generally addresses the communication of digital messages among processing units and more specifically addresses an interrupt technique by which the flow of messages from one processor to another is controlled.

Communication systems employ a plurality of processing units each with one or more microprocessors to control, route and process messages. For example, a host processor may have the assigned task of formatting and routing packets representing voice or data communications between users. A client processor connected to the host processor may have responsibility for collecting and feeding user communications from several communication channels to the host. The user communications must be passed between the host and client processors.

One known technique for controlling the transmission of messages between the host and client processors is to use interrupts between the processors. As used herein an interrupt refers to a real time signal or data which is received by a processor to alert it to a request for a corresponding action or processing task. For duplex communications between the host and client processors, each typically generates an interrupt to the other to request the processing of messages held by the interrupting processor. A reply message or interrupt from the interrupted processor to the interrupting processor is sent to indicate whether the interrupting processor's request is accepted. The receipt of interrupts by a processor under a heavy processing load exacerbates the load. The denial of interrupt requests due to heavy loading of the interrupted processor may lead to the undesired situation of receiving an increasing number of interrupt requests as the interrupting processor's need for service from the interrupted processor grows.

Because an interrupt is typically asynchronous, a certain latency of timing exists. Careful design of such an interrupt scheme is thus required. Problems exist such as when a first interrupt is being serviced when a second interrupt is being issued. In this situation the second interrupt may be masked out or not recognized by the receiving processor depending upon the timing of the second interrupt and the processing occurring in response to the first interrupt. Such problems are aggravated where the processors operate at different speeds and are not synchronized to each other.

Polling is another technique utilized to permit processors to communicate messages. A polling technique may utilize service flags at predetermined memory locations. Each service flag may represent a request by one processor to write or transfer messages for processing to the other processor. However, this technique requires periodic reading of the service flags to check for a change of state of the service flags. Such a technique is not real time deterministic and is not efficient for high message traffic conditions which require a frequent polling (reading) of the service flags.

Thus a need exists for an improved technique for handling interprocessor message transfers. This need is especially critical for systems in which at least one of the processing units is likely to periodically encounter high processing loads.

SUMMARY OF THE INVENTION:

It is an object of the present invention to address this need by providing an improved solution to the problem of handling the transfer of messages among processing units. The present invention is especially, but not exclusively, suited for operation during heavy traffic loads.

In accordance with an exemplary method, the communication of messages is controlled among at least a host processing unit and an auxiliary processing unit. One of the host and auxiliary processing units is determined to be capable of accepting messages from the other. Upon such determination, a token interrupt is transmitted from the one (processor to receive work) to the other (processor from which work is sent). The token interrupt represents the ability of the one processor to accept and process messages from the other. A message interrupt is transmitted from the other processor to the one processor only if a token interrupt has been received by the other and if no message interrupt has been transmitted from the other to the one since having received the token interrupt. The message interrupt identifies at least one data message to be processed by the one processor. This technique requires the prior permission of the one processor to be given before the other processing unit is permitted to seek service by transmitting a message interrupt.

DETAILED DESCRIPTION

Figure 1:
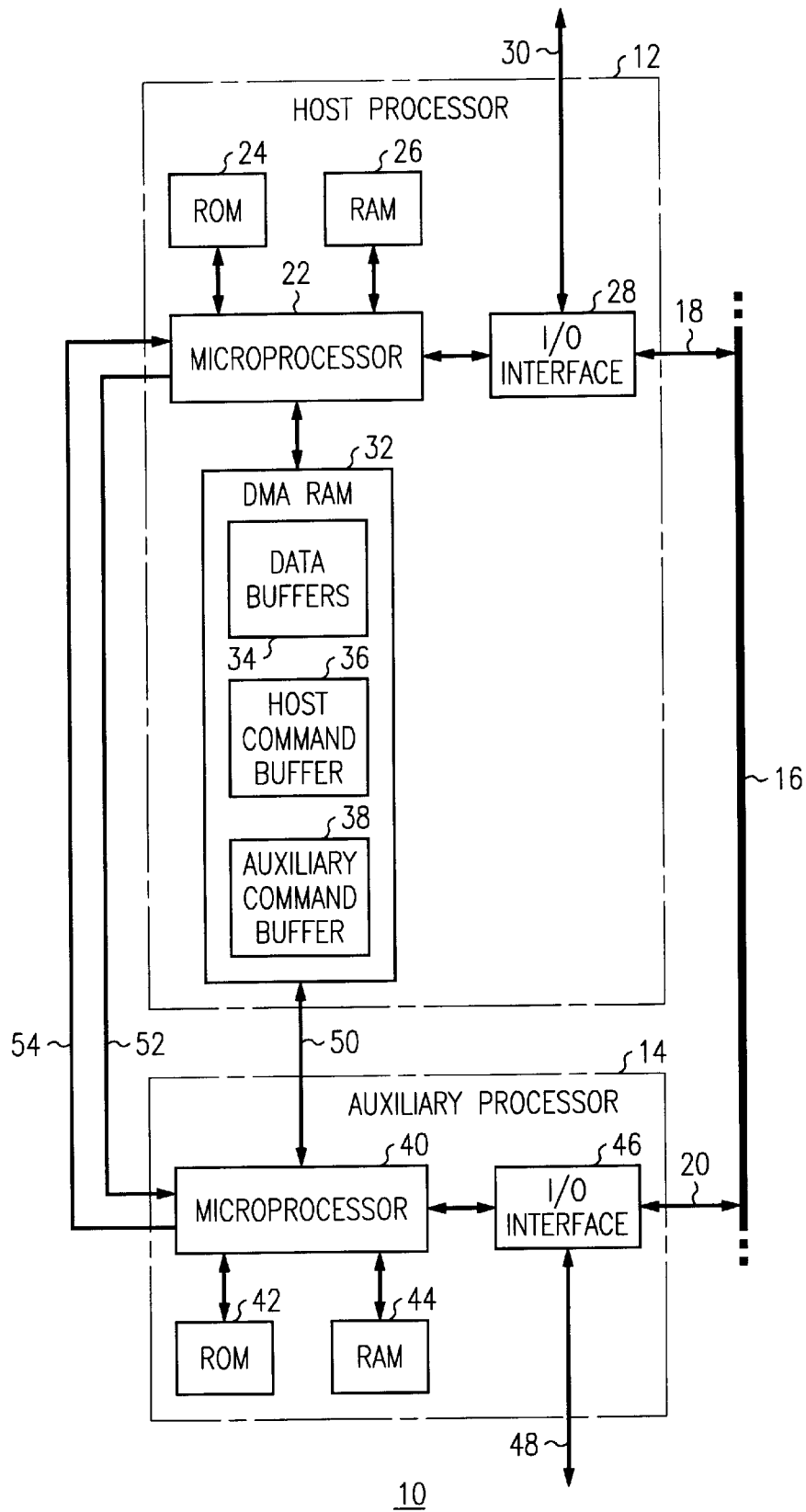
FIG. 1 is a block diagram of a portion of a communication system which incorporates an embodiment of the present invention.

In accordance with an embodiment of the present invention, a portion of a communication system 10 includes a host processor 12, an auxiliary processor 14 and a common data bus 16. Communication links 18 and 20 couple the host and auxiliary processors 12 and 14, respectively, to the data bus 16. In the illustrated embodiment, the communication system comprises part of a telecommunication network in which a plurality of simultaneous communication channels between users are supported. The communication of information between users is digitized and may comprise packets or other digitized formats to convey information between the users. Host processor 12 receives packets of information and data related to shared memory from auxiliary processor 14 by the data bus 16, and transforms the received packets into a different format such as transforming pulse code modulation (PCM) information into an asynchronous transfer mode (ATM) cell format. However, it will be apparent to-those skilled in the art that the embodiment of the present invention can be utilized in a variety of applications in which data messages must be communicated between two or more processors.

The host processor 12 includes a microprocessor 22 supported by read only memory (ROM) 24, random access memory (RAM) 26 and an input/output interface 28 which facilitates communications between microprocessor 22 and communication channels 18 and 30. Channel 18 couples the processor with data bus 16. Communication channel 30 enables communications between the microprocessor and other devices or transmission media. An additional random access memory 32 is coupled to microprocessor 22 and facilitates direct memory access (DMA) by microprocessor 22. The RAM 32 may be segregated into storage locations representing data buffers 34, host command buffers 36 which store information to be acted on by the host, and auxiliary command buffers 38 which store information to be acted on by the auxiliary processor. In the illustrated embodiment, the data buffers 34 are used to store user data or traffic to be processed. The host command buffers 36 and auxiliary command buffers 38 store commands and address information corresponding to the user data stored in the data buffers 34. Further explanation of the host and auxiliary command buffers is provided with regard to FIG. 2.

Auxiliary processor 14 includes a microprocessor 40 which is supported by ROM 42, RAM 44 and an input/output interface 46. The microprocessor 40 communicates information by channels 20 to data bus 16 and to other apparatus and transmission facilities by communication channel 48. The microprocessor 40 is also connected by path 50 to the RAM 32 to provide microprocessor 40 with DMA access capabilities to RAM 32. Thus, microprocessors 22 and 40 share access with common memory locations in RAM 32.

Microprocessor interrupt signals are communicated between microprocessor 22 of host processor 12 and microprocessor 40 of auxiliary processor 14 by communication paths 52 and 54. As will be more fully explained below, each microprocessor may generate a token interrupt which is transmitted to the other microprocessor as a signal representing that the microprocessor generating the token interrupt is available to process additional messages.

Figure 2:
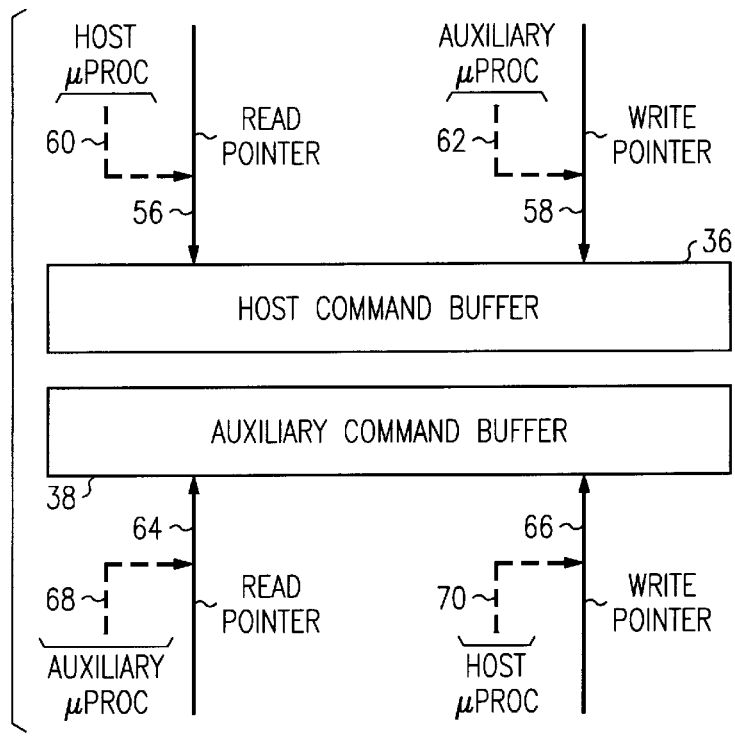
FIG. 2 is a diagram illustrating the use of buffers of the system of FIG. 1.

FIG. 2 illustrates the function and operation of the command buffers 36 and 38 as shown in FIG. 1. Each of these buffers may be visualized as consisting of a circular queue which stores commands and indices (addresses) to messages stored in corresponding locations in the data buffers 34. The commands and addresses stored in the host command buffer 36 are written by microprocessor 40 of the auxiliary processor 14. Similarly, the commands and addresses stored in the auxiliary command buffer 38 are written by microprocessor 22 of host processor 12. The commands and addresses contained in the buffers 36 and 38 are read in response to message interrupts generated by the microprocessor which controls the writing of information to the corresponding buffer. Those skilled in the art will appreciate that the commands may be stored in predetermined memory locations and merely indexed (addressed) by information stored in the command buffers in order to minimize memory needs and read/write operations. In the preferred embodiment, commands and data are stored in memory requests of fixed size; however the length of the data and commands are not fixed.

The host command buffer 36 includes a read pointer 56 and a write pointer 58. As indicated by the dashed lines 60 and 62, the host processor controls the movement of the read pointer 56 and the auxiliary processor controls the movement of the write pointer 58. As may be visualized as moving from left to right in FIG. 2, the read pointer 56 moves as the host processor reads stored commands and addresses in buffer 56 in response to receipt of a message interrupt. The write pointer 58 moves from left to right as the auxiliary processor writes additional commands and addresses into buffer 36. As noted above these buffers should be considered as circular and hence the pointers when approaching the right end of the buffer will wraparound to the left end and continue. The interval between the read pointer 56 and write pointer 58 indicates information which has been written to the buffer and has yet to be read. The interval between the write pointer 58 to the right end of buffer 36 and from the left end of buffer 36 to read pointer 56 represents the available storage space for additional commands and addresses.

Auxiliary command buffer 38 is substantially identical in operation as described for the host command buffer 36. Read pointer 64 is controlled by the auxiliary processor 14 as indicated by dashed line 68 and write pointer 66 is controlled by the host processor 12 as indicated by dashed line 70. The auxiliary command buffer stores commands and addresses written by the host processor. The addresses stored in buffers 36 and 38 refer to corresponding messages (user information) stored in the data buffer area 34 of RAM 32. Similar to buffer 36, the read pointer moves from left to right indicating the reading of information under the control of the auxiliary processor in response to receipt of a message interrupt. The write pointer moves from left to right under the control of the host processor which controls the locations in buffer 38 in which commands and addresses are written. The commands and addresses are stored in buffers 36 and 38 and are read upon receipt of a message interrupt generated by the processor which writes to the subject buffer. In the preferred embodiment, the pointers 56, 58, 64 and 66 are stored in RAM 26 and/or RAM 44.

Figure 3:
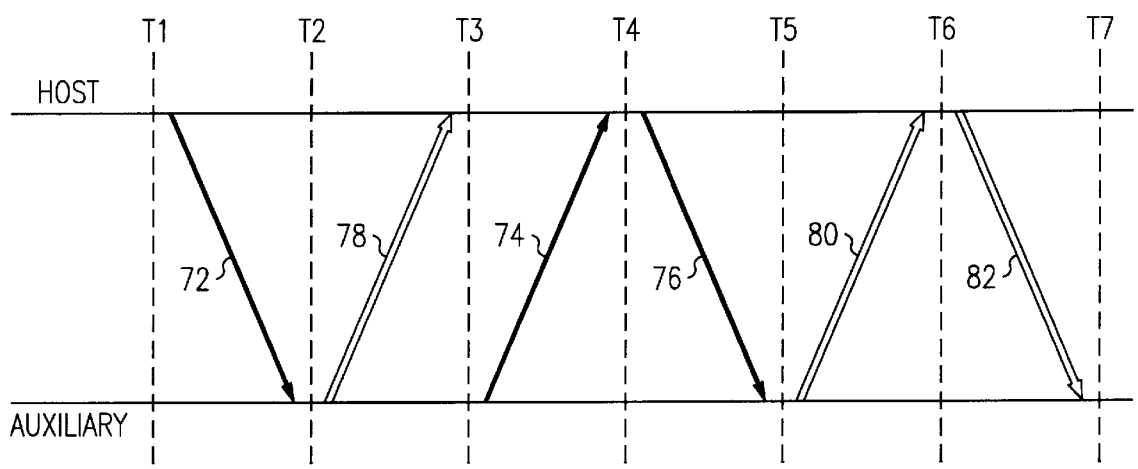
FIG. 3 is a timing diagram illustrating the use of token interrupts and message interrupts in accordance with an embodiment of the present invention.

FIG. 3 is a time diagram illustrating the generation of token interrupts and message interrupts by the host processor 12 and auxiliary processor 14. Time increases from left to right with points in time denoted at locations T1–T7. The time intervals between adjacent time points are used to illustrate the transmission and reception of token interrupts and message interrupts. In this diagram, token interrupts 72, 74, and 76, and message interrupts 78, 80, and 82 are shown. This Figure represents steady state operation. On initial startup, each processor may send out a token interrupt to signal its availability and existence.

In accordance with FIG. 3 assume an exemplary embodiment in which prior to time T1 (left of T1) neither the host nor auxiliary processor has generated a token interrupt following the receipt of a message interrupt. Since neither processor has received a token interrupt from the other, neither is permitted to generate a message interrupt. In the time interval T1–T2, token interrupt 72 is generated by the host processor and transmitted to the auxiliary processor. At time T2 the auxiliary processor is permitted to transmit a message interrupt to the host processor but the host processor is still inhibited from transmitting a message interrupt to the auxiliary processor since it has not yet received a token interrupt from the auxiliary processor.

During interval T2–T3, the auxiliary processor generates a message interrupt 78 which is transmitted to the host processor. The message interrupt requests the host processor to read a plurality of commands and addresses in buffer 36 identifying corresponding user data stored in buffers 34 to be processed by the host processor. Thus, a single message interrupt can control the processing of a plurality of user messages. At time T3, neither the host nor auxiliary processor will be permitted to send a message interrupt. The host is prevented since it has never received a token interrupt from the auxiliary processor. The auxiliary processor is inhibited from sending another message interrupt after message interrupt 78 since the receipt of another token interrupt from the host is required before another message interrupt can be transmitted.

During interval T3–T5, token interrupt 74 is transmitted from the auxiliary processor to the host processor. Also, the host transmits a token interrupt 76 to the auxiliary processor. Thus, at time T5 both the host and auxiliary processors are free to transmit message interrupts to the other. In interval T5–T6, the auxiliary processor transmits a message interrupt 80 to the host processor. At time T6, the auxiliary processor is inhibited from transmitting further message interrupts to the host since message interrupt 80 has been previously transmitted and a later token interrupt from the host has not been received. However, at T6, the host processor is free to transmit a message interrupt to the auxiliary processor since it received token interrupt 74 and has not generated a message interrupt since its receipt. During interval T6–T7, the host generates message interrupt 82 which is transmitted to the auxiliary processor. At time T7, neither the host nor the auxiliary processor is permitted to transmit a message interrupt since neither has received a token interrupt since transmitting a message interrupt.

It should be noted that the technique described with regard to FIG. 3 provides efficiencies over prior art techniques, especially during a momentary heavy load of one of the processors. One of the advantages of the present invention resides in the ability of a processor with a temporary heavy load to inhibit the additional load of processing a message interrupt by withholding the transmission of a token interrupt to the other processor. As will be understood by those skilled in the art, the system must balance the host and auxiliary processor systems so that sufficient memory is available to store user messages during periods of heavy load in which a processor inhibits incoming requests for message processing by not sending a token interrupt. In accordance with the illustrative embodiment, each processor can monitor the amount of data being stored by the other processor based on the position of the pointers associated with buffer 36 or 38. This information can be utilized to prevent data storage overflow which could be caused by the excessive delay in the transmission of a token interrupt.

Figure 4:
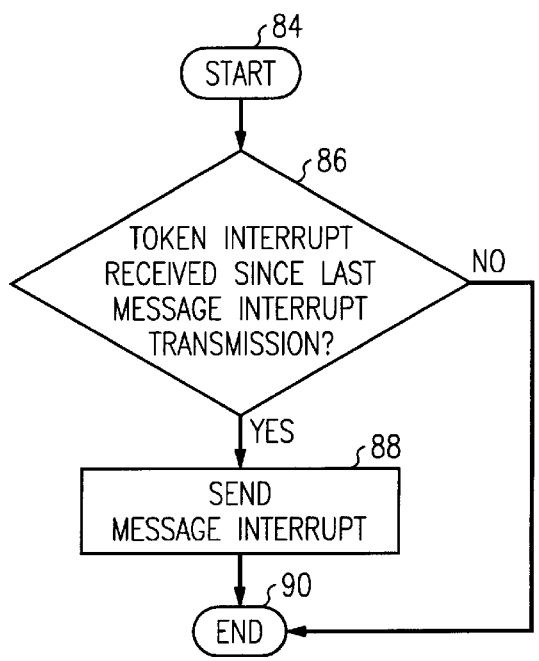
FIG. 4 is a flow diagram illustrating the generation of message interrupts by a processor.

FIG. 4 illustrates a flow diagram of the generation of message interrupts by a processor. Beginning at START 84, a determination is made by step 86 of whether a token interrupt has been received by the processor since the last message interrupt was sent. A NO determination causes processing to terminate at END 90. Although a NO determination by step 86 terminates processing of the current message interrupt consideration, this process (FIG. 4) will be periodically executed if user messages await further processing by the other processor. A YES determination in step 86 indicates that a token interrupt has been received since the last transmission of a message interrupt. Following the YES determination, a send message interrupt step 88 is executed to transmit a message interrupt to the other processor. This procedure terminates at END 90.

Figure 5:
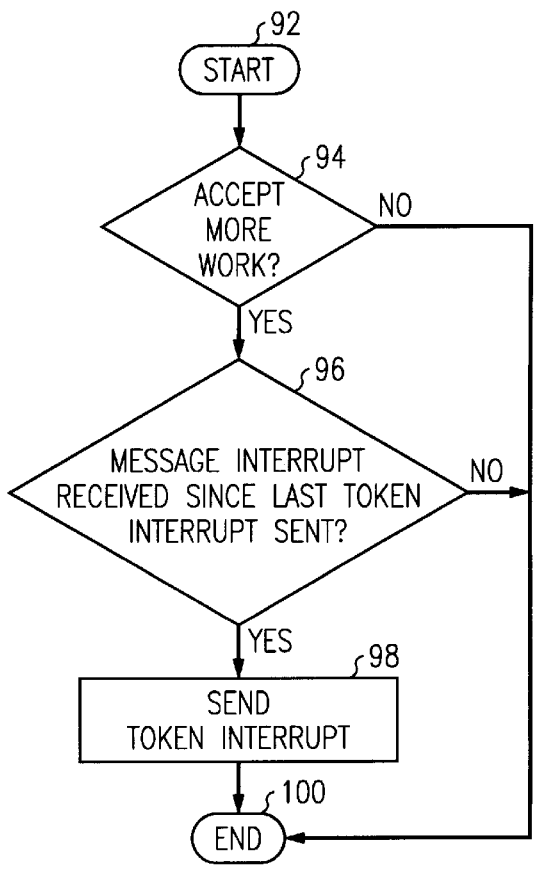
FIG. 5 is a flow diagram illustrating the generation of token interrupts by a processing unit.

FIG. 5 is a flow diagram illustrating the generation and transmission of a token interrupt by a processor. Beginning at START 92, determination step 94 determines whether the processor can accept more work, i.e. accept the further processing of additional commands or messages from the other processor.

This determination is based on the loading status of the processor executing the process of FIG. 5. In order to maintain an overall system balance, the determination 94 may also take into consideration: (a) the capacity of the other processor to store and continue to accumulate information to be processed by the subject processor, and (b) system design parameters such a maximum time in which user messages must be processed to guarantee a maximum throughput delay. A NO determination results in the termination of further consideration of whether to send the token interrupt and terminates the process at END 100. A YES determination at step 94, indicates that more work should be accepted, i.e. commands and messages from the other processor can be processed. In step 96, a determination is made of whether a message interrupt has been received since the last token interrupt was sent. A NO determination terminates the process at END 100. This represents that a message interrupt from the other processor has not been received since the last token interrupt was sent by the current processor and hence there is no need to send another token interrupt. A YES determination by step 96 indicates that a message interrupt has been received since the last token interrupt and causes step 98 to send a token interrupt to the other processor. The routine then terminates at END 100. A NO determination by steps 94 or 96 results in the main program of the processor returning to the routine at START 92 either periodically or upon the occurrence of certain events to recheck whether additional work should be performed.

Although an exemplary embodiment and application of the present invention has been discussed, it will be apparent to those skilled in the art that various modifications of the embodiment are possible as well as additional applications of the invention. For example, token interrupts and message interrupts can be utilized among three or more processors to control the flow and processing of commands and user messages. The physical environment of processors operating in accord with this invention may include processors which are physically separated in housings or on different circuit modules. However, it will also be understood that a plurality of processors as used herein may reside on a single physical board or structure.

Although an embodiment of the present invention has been described above and illustrated in the drawings, the scope of the invention is defined by the claims which follow.

What is claimed is:

1. A method for controlling the communication of messages among at least a host processing unit (hpu) and an auxiliary processing unit (apu) comprising the steps of:

determining one of the hpu and apu to be capable of accepting messages from the other of the hpu and apu, initiation of said determining step by said one is independent of receipt by said one of a prior request to communicate from said other;

transmitting a token interrupt from said one to the other, the token interrupt indicating to the other that the one will accept additional messages;

transmitting a message interrupt from the other to the one only if said token interrupt has been received by the other from the one and if no message interrupt has been transmitted from the other to the one since receiving the token interrupt, the message interrupt identifying at least one data message to be processed by the one, whereby permission from the one processing unit must be given before the other processing unit is permitted to transmit a message interrupt to the one processing unit.

2. The method according to claim 1 wherein the step of transmitting the token interrupt from said one to the other further comprises the generation of the token interrupt by the one based on the ability of the one to process additional messages and is not in response to receipt of a communication from the other.

3. The method according to claim 1 further comprising the step of the hpu and apu monitoring their capacity to process additional messages independent of any communication received from the other, said determining step based on said monitoring.

4. The method according to claim 1 wherein the step of transmitting the message interrupt comprises identifying during a single message interrupt a plurality of data messages to be processed by the one so that each message interrupt controls the processing of a plurality of data messages.

5. The method according to claim 4 further comprising the steps of:

using memory accessed by the hpu and apu by direct memory access to store the data messages to be processed;

extracting, in response to a received message interrupt, addresses of locations in the memory that identify corresponding data messages to be processed by the one, whereby a single message interrupt can identify a plurality of data messages to be processed without replicating the data messages.

6. A communication apparatus in which messages are communicated among at least a host processing unit (hpu) and an auxiliary processing unit (apu), the apparatus comprising:

means for determining if one of the hpu and apu are capable of accepting messages from the other of the hpu and apu, said determining means initiating said determination independent of receipt of a prior request to communicate from said other;

means for transmitting a token interrupt from said one to the other in response to said determining means determining the one is capable of accepting messages from the other, the token interrupt indicating to the other that the one will accept additional messages;

means for transmitting a message interrupt from the other to the one only if said token interrupt has been received by the other from the one and if no message interrupt has been transmitted from the other to the one since receiving the token interrupt, the message interrupt identifying at least one data message to be processed by the one, whereby permission from the one processing unit must be given before the other processing unit is permitted to transmit a message interrupt to the one processing unit.

7. The apparatus according to claim 6 wherein the means for transmitting the token interrupt from said one to the other further comprises the generation of the token interrupt by the one based on the ability of the one to process additional messages and is not in response to receipt of a communication from the other.

8. The apparatus according to claim 6 further comprising means for monitoring the capacity to process additional messages independent of any communication received from the other, said determination for the determining means based on results of said monitoring means.

9. The apparatus according to claim 6 wherein the means for transmitting the message interrupt further comprises identifying during a single message interrupt a plurality of data messages to be processed by the one so that each message interrupt controls the processing of a plurality of data messages.

10. The apparatus according to claim 9 further comprising:

means for accessing memory using direct memory access by the hpu and apu to store the data messages to be processed;

means, responsive to receipt of a received message interrupt, for extracting addresses of locations in the memory that identify corresponding data messages to be processed by the one, whereby a single message interrupt can identify a plurality of data messages to be processed without replicating the data messages.

* * * * *